United States Patent [19]

Latouche

[11] Patent Number: 5,313,735
[45] Date of Patent: May 24, 1994

[54] ROTATABLE HANDLE EXTENSION FOR FISHING RODS AND THE LIKE

[76] Inventor: Desmond J. Latouche, 1315 Patricia Blvd., Kingsville, Ontario, Canada, N9Y 2R3

[21] Appl. No.: 49,993

[22] Filed: Apr. 20, 1993

Related U.S. Application Data

[63] Continuation-in-part of Ser. No. 940,086, Sep. 3, 1992, abandoned.

[30] Foreign Application Priority Data

Mar. 2, 1992 [CA] Canada ................................. 2062162

[51] Int. Cl.⁵ .............................................. A01K 87/00
[52] U.S. Cl. .......................................... 43/25; 43/23; 16/114 R; 248/538; 403/260
[58] Field of Search ...................... 43/22, 23, 25, 18.1; 16/114 R, 114 A; 248/118, 118.1, 118.3, 538, 511, 534; 403/260, 258

[56] References Cited

U.S. PATENT DOCUMENTS

| | | |
|---|---|---|
| 3,072,955 | 1/1963 | Mitchell ............................ 16/114 R |
| 3,159,939 | 12/1964 | Transeau .................................. 43/25 |
| 3,648,887 | 3/1972 | Hartley ............................... 16/114 A |
| 4,013,372 | 3/1977 | Lay et al. ............................. 403/237 |
| 4,014,129 | 3/1977 | Capra ....................................... 43/23 |
| 4,572,545 | 2/1986 | Dooley, Jr. et al. ......... 16/DIG. 12 |
| 4,822,087 | 4/1989 | DeCarlo ................................. 43/11 |
| 4,949,457 | 8/1990 | Burout, III ....................... 16/110 R |

Primary Examiner—Paula A. Bradley
Assistant Examiner—Chuck Y. Mah
Attorney, Agent, or Firm—Bauer & Schaffer

[57] ABSTRACT

A rotatable mechanism for reversibly attaching an extension onto a long member is described; examples include an ergonomically correct extension, which fits and supports the entire natural shape of the arm, from the heel of the hand, along the inner wrist and up the forearm, thus combining the principle of leverage with the body's natural muscular dynamics, to transfer the load and strain away from the wrist to the more powerful muscles of the upper arm and shoulder. In a first embodiment, splines run on the outside of a shaft affixed previously to a handle, and co-operate with splines on the inside surface of a cylindrical hole in the extension. A screw inserted through the extension and threaded into a hole in the end of the handle prevents longitudinal separation between the handle and extension, and the splines prevent rotational movement. In cases where the handle needs to be rotated, such as a fishing reel designed to hang down instead of up, the screw is released, the extension disengaged, rotated, reinserted, and the screw is inserted and tightened. A second embodiment describes a simple screw-on clamp to achieve the same function, while incorporating adjustable sizing bushings so the extension can be an integral part of differing sizes and shapes of handles, including frying pans, shovels, garden equipment, geriatric aids, jackhammers, and the like. Both forms of the rotatable extension also permit easy adjustment to comfortably accommodate right- or left-handed users.

8 Claims, 9 Drawing Sheets

ROTATABLE HANDLE EXTENSION FOR FISHING RODS AND THE LIKE

RELATED APPLICATION

This application is a continuation-in-part of U.S. patent application Ser. No. 74/940,086, filed Sep. 3, 1992, now abandoned.

INTRODUCTION AND DESCRIPTION OF THE PRIOR ART

Those who have spent appreciable amounts of time fishing know that eventually the weight of the rod, born by the wrist and the muscles of the forearm, becomes a burden. Indeed, such is the widespread nature of the problem that it has become a shared joke across many cultures to depict, usually in cartoons and other drawings, that the person fishing is sitting beside the pole, which is propped up with stones or stuck in the dirt. This, of course, means the loss of any fish that could be felt nibbling and jerked onto the hook if the rod had been securely held in the hand.

Besides this, and the most important problem, is the extreme pressure which must be born by the wrist and forearm muscles when a strike is made; during fighting a fish; and likewise when a net is employed to scoop a fish.

The present invention uses an ergonomically correct design to conform to and support the entire natural shape of the human arm, from the heel of the hand, along the wrist, and up the forearm. It supports the inner wrist to prevent over-articulation of the wrist, which can strain the wrist tendons and cause fatigue and promote tendonitis.

The design also cradles the heel of the hand and thus provides an anchor against linear motion and longitudinal strain from the rod, and weight of the reel, during casting. Both the add-on version and the version which forms an integral part of the rod or landing net allow any rotational orientation of the extension with respect to the rod and reel. This even further enhances the comfort zone of the individual user of any arm shape and size, and it is this ergonomically correct design which uniquely sets this invention apart from other devices. The extension conforms to the arm's natural contour, and using the principle of leverage it takes load away from the wrist to the more powerful muscles of the upper arm and shoulder, alleviating the discomfort and awkwardness associated with fighting and landing even medium-sized fish. As prototype models of the new device have clearly demonstrated, with only one hand needed to control the rod, critical control of the reel can easily be maintained. And with an extension on both rod and net, large fish can be landed single-handedly. As well, casting is more powerful, due to a catapult effect. This extension will be available regardless of whether the rod-handle needs to be rotated, which happens because some reels are designed to function in the up position, above the handle, while others hang down from the handle.

In the case of the rod, a simple reversible interlock with ingeniously arranged interlocking longitudinal spines, fastened with a conventional screw, will allow the extension to be inverted to accommodate cases where the design of the fishing line spool necessitates turning the rod 180 degrees; and also allow the extension to be set at a comfortable user-chosen angle to the side. For the net, or for rods without a sleeve in place to accept the interlock, a screw-clamp will accomplish the same purpose. Flexible sizing bushings inside the screw-clamps will allow differing diameters of rods to be accommodated; and the bushings, as will be described, are arrangeable so that even non-circular cross-sectioned handles, such as a frying-pan handle, can be fitted. And all manner of snow and gardening or concrete shovels and other similar tools are also improveable with this device; as are more heavy-duty tools such as snow blowers and jackhammers.

The prior art shows that somewhat different, and limited, attempts have been made at solving this problem in the past. Canadian patent No. 1,003,214, whose purpose is to provide a removable coupling between the rod portion and the handle portion of a fishing rod, specifies, in one embodiment, longitudinal spines on one surface only, in conjunction with an O-ring for frictional prevention of slippage. But the provision of interlocking spines is not anticipated, and this useful improvement allows easy and secure use, rotation, and removal of the weight-bearing extension. U.S. Pat. No. 3,372,510, although providing a small arm-rest as a part of the invention's function, similarly does not anticipate the interlocking spline system and must resort to a different embodiment to deal with cases where the rod-handle is rotated. The result is completely impractical, for at least three reasons: one, lack of support for the wrist allows over-articulation of the wrist; two, rotational torque around the central axis of the handle could cause the handle to rotate during casting or if any side load were applied to the rod tip by fish; and three, the finger of the user would never reach the line during normal spinning or bait-casting. U.S. Pat. No. 4,013,372, Lay et al., and U.S. Pat. No. 4,008,971, Wah et al., both show longitudinal splines on one surface only, and these are specified for "press-fit," and "friction-fit," respectively, in the two disclosures; interlocking splines are again not anticipated. As well, both of these inventions relate to a member joining another member at right angles, rather than the generally parallel extension of the preferred embodiment of the present invention; and neither Lay nor Wah allows adjustable rotation.

U.S. Pat. No. 4,014,129, Capra, shows a buoyant fishing-rod handle replacement with a limited forearm support; in the preferred embodiment it is shown without any rotational capabilities, and with the support parallel to and directly above the surface of the handle; this forces the fishing-person to hold their hand and wrist at an unnatural angle, causing points of extreme tendon strain due to over-articulation of the wrist; there is no support at the heel of the hand or inner wrist area. In fact Capra provides no more support than a standard rod handle; the Capra support does not extend away from the fishing rod handle's shaft, and does not rotate; both of these capabilities are found in the preferred embodiment of the present invention. A further embodiment in Capra shows a support with a screw-clamp which presumably could be rotated; however no special sizing bushings are provided such as in the present invention for differing sizes or shapes of handles. Similarly U.S. Pat. No. 2,146,350, Roberts, and U.S. Pat. No. 3,367,056, Johnson, provide clamped supports similar to Capra's second embodiment, without sizing bushings; and the support itself is in each case smaller and differently shaped from that of the present invention, and so again does not support the heel of the hand and inner wrist, and cannot prevent over-articulation of the wrist.

Of lesser interest are U.S. Pat. No. 4,822,087, De Carlo, which shows a gripping handle functioning with a small arm support, as a leverage means, and which allows a rotational torque around the gripping handle which could be dangerous in use; U.S. Pat. No. 4,949,457, which pertains to a razor handle, and uses (two only) elongate recess interlocks to prevent rotation between an inner and an outer surface, rather than a symmetrical series of interlocks designed to prevent rotation during use and allow it during adjustment; and U.S. Pat. No. 4,572,545, Dooley, Jr., et al., which shows splines functioning as "grip-enhancing projections," on a ski-pole handle cover that can be "forgotten once installed."

An object of the present invention is to provide a system for fixing and reversibly adjusting relative rotation between two coaxial tubular members, comprising: a shaft fashioned to fit closely overtop of an inner tubular member, the shaft being solidly affixed to the member; a plurality of generally identical equally-spaced longitudinal splines extending radially outwards from the shaft; an outer tube formed to closely receive and closely fit overtop the inner tubular member; a plurality of generally identical longitudinal splines along the inside surface of the outer tube; the splines on the outer member being fashioned to co-operate with the splines extending radially outwards from the shaft; and reversible means of preventing longitudinal separation between the inner and outer tubular members; whereby the outer tube may be placed coaxial with, and at a desired angle of rotation relative to, the inner tubular member, and overtop the inner member, and fixed both rotationally and longitudinally relative to the inner member by the means of preventing longitudinal separation; and whereby the outer tube may be moved to a new angle of rotation relative to the inner tubular member by disengaging the means of preventing longitudinal separation; separating the inner and outer tubes longitudinally; rotating the outer relative to the inner tubular member to a new angle of rotation; placing the outer tube overtop and coaxial with the inner member; and re-engaging the means of preventing longitudinal separation.

A further object of the invention is to provide for a weight-bearing system for a fishing rod handle or net handle providing user-choosable incrementally rotatable support positions, comprising: a shaft securely affixed overtop of the end of the handle; a plurality of generally identical equally-spaced longitudinal splines extending radially outwards from the shaft; an extension formed to fit a user's arm from the heel of the hand along the wrist and forearm; a hole in the extension fashioned to closely receive and closely fit the shaft; a plurality of generally identical longitudinal splines along the inside surface of the hole; the splines being fashioned to co-operate with the splines extending radially outwards from the shaft, this co-operation having as it primary function the prevention of rotation of the shaft relative to the extension; a means of attaching the extension to the handle or to the shaft to prevent longitudinal separation between the extension and shaft; this means being removable to permit such separation when desired. The means of attaching could be a screw inserted in a hole in the extension and threaded into a hole in the handle end, such that threading the screw inside the handle pulls the head of the screw against the extension, thereby pulling the extension and handle together longitudinally.

A yet further object of the invention is to provide a system for attaching a weight-bearing extension onto differing sizes of round cross-sectioned or irregularly cross-sectioned handles in such a manner as to permit the extension to be removed and rotated and re-attached, comprising: a tubular hole in the extension fashioned to closely receive the handle; clamping means to attach the extension to the handle; and generally tubular sizing bushings inside the tubular hole, the bushings being formed of a substance soft enough for a user to cut or otherwise shape; whereby a user may add or remove one or more bushings, or parts of bushings cut to fit, inside the tubular hole, and thereby, in conjunction with the clamping means, snugly affix different sizes or cross-sections of handles firmly inside the tubular hole; and whereby the user may release the clamping means, rotate the extension relative to the handle, add, remove, or adjust bushings if necessary, and replace the clamping means, so that the weight-bearing extension is secured at a different angle relative to the handle. The handle could be chosen from the group consisting of: a fishing rod handle; a net handle; a tire iron handle; a cooking pot handle; a frying pan handle; a gardening trowel handle; a floor-polisher handle; a motorized hedge-trimmer handle; a walker handle; a snow-blower handle; a jack-hammer handle; and a wrench handle. The screw-clamp could consist of screws inserted into one arm and turned into threaded holes in an opposing arm, such that tightening the screws will bring the arms together against the handle or against the bushings.

DETAILED DESCRIPTION OF THE INVENTION

For this description, refer to.

Figure 1:
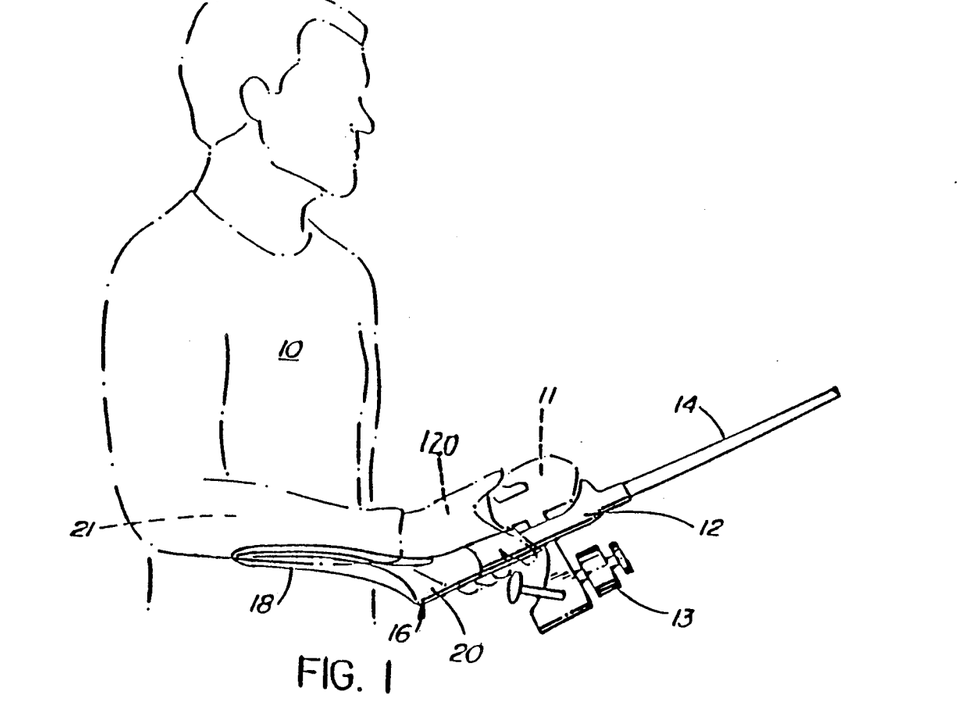
FIG. 1, oblique view of invented extension, in usage situation, with optional reel position.

Referring to FIG. 1, person generally indicated as 10 holds handle 12 of rod 14. Reels 11 and 13 are shown affixed to the upper and lower sides respectively of handle 12, but reel 11 is shown dotted to indicate that handle 12 and connected rod 14 will need to be rotated to achieve this position in cases where reels are permitted to be affixed to one surface only of handle 12, which is a common situation. Weight-bearing extension generally indicated as 16 has long flange portion 18 and coupling portion 20. Side of flange 18 facing forearm 21 of person 10 is fashioned as a concave curve. Thus, as can be seen most clearly on FIG. 2C showing fly-casting reel 300, extension 16 smoothly and evenly bears the pressure from the heel 230 of the hand 120, along the wrist 23 and up the forearm 21. (These aspects of extension 16 can be seen especially well also on FIGS. 3A and 9B, both of which illustrate a further embodiment employing a different attachment system, to be described later).

To explain the first embodiment in more detail: secure coupling of extension 16 to handle 12 is accomplished as follows: referring now to FIG. 2, shaft 22 is glued or otherwise affixed in a permanent manner around the outside of a handle 12. Shaft 22 has longitudinal splines 24 fashioned into its surface on the end remote from the handle 12. These splines 24 can be seen in more detail on FIG. 2A and FIG. 2B. Likewise, again referring to FIG. 2 and for more detail to FIGS. 2A and 2B, extension coupling 20 has lengthwise splines 26 fashioned on the inner surface of borehole 28 to receive splines 24 of shaft 22. As can be clearly seen on FIG. 2A and 2B, the interlock between the plurality of adjacent splines 26 and 24 will prevent any rotation of shaft 22 and attached handle 12 relative to extension coupling 20. It can also be appreciated that the coupling splines 26 are fashioned to be identical to one another, as also are the shaft spline 24, so that if handle 12 and accompanying affixed shaft 22 is removed and rotated less than a full rotation and then re-inserted, the plurality of splines 24 on shaft 22 will still interlock with the plurality of splines 26 on extension coupling 20, and further rotation will again be prevented until longitudinal removal is again undertaken. So person 10 in FIG. 1 may choose the position shown, or any other rotational position not shown, to allow flange 18 to sit comfortably, as seen on FIG. 2C, against the entire area from the heel 230 of hand 120 and along the wrist 23 and up the forearm 21 for whatever style of fishing they prefer; in FIG. 2C fly-casting reel 300 is shown as example. Note also on FIG. 2 that shaft 22 will preferably have cork layer 220 (as shown) or foam rubber or the like overtop shaft 22, extending the same radial distance away from shaft 22 as does extension 16, so that points 221 and 222 on FIG. 2 constitute a smooth join and any user gripping handle 12 will do so comfortably and usefully.

Figure 2:
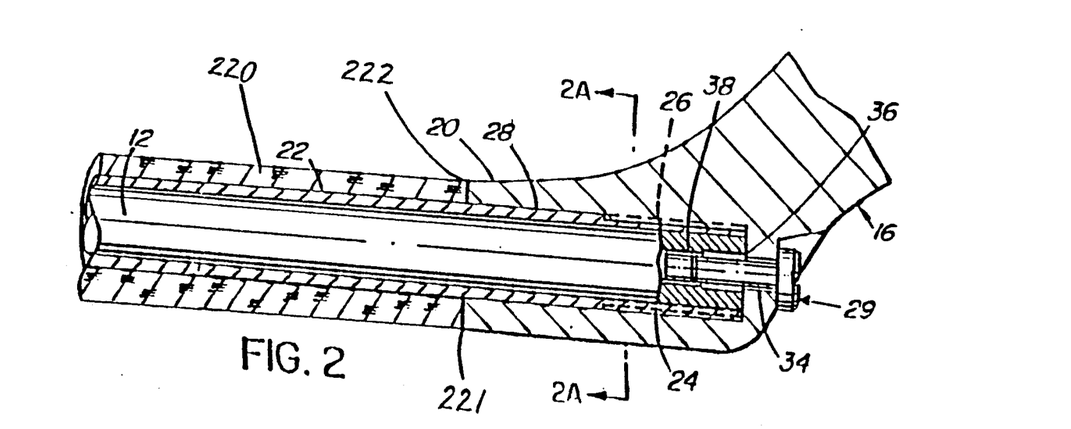
FIG. 2, section elevation of coupling of extension on rod end.
Figure 2A:
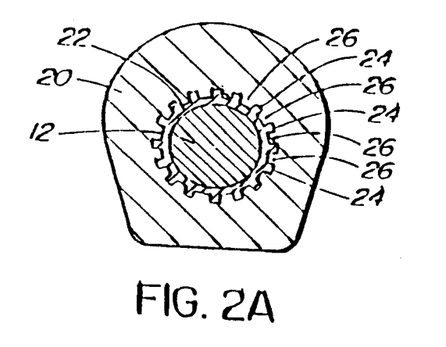
FIG. 2A, section of FIG. 2, showing splines interlocking.
Figure 2B:
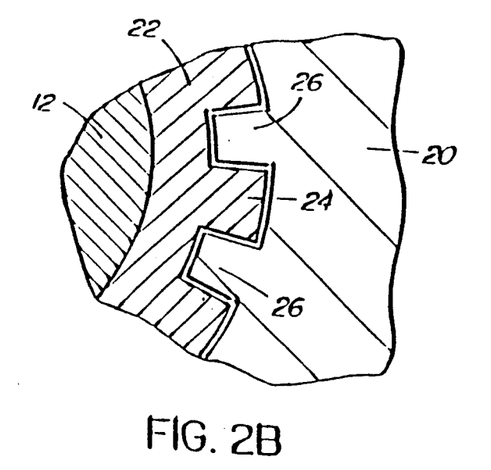
FIG. 2B, detail of FIG. 2A, showing splines interlocking.
Figure 2C:
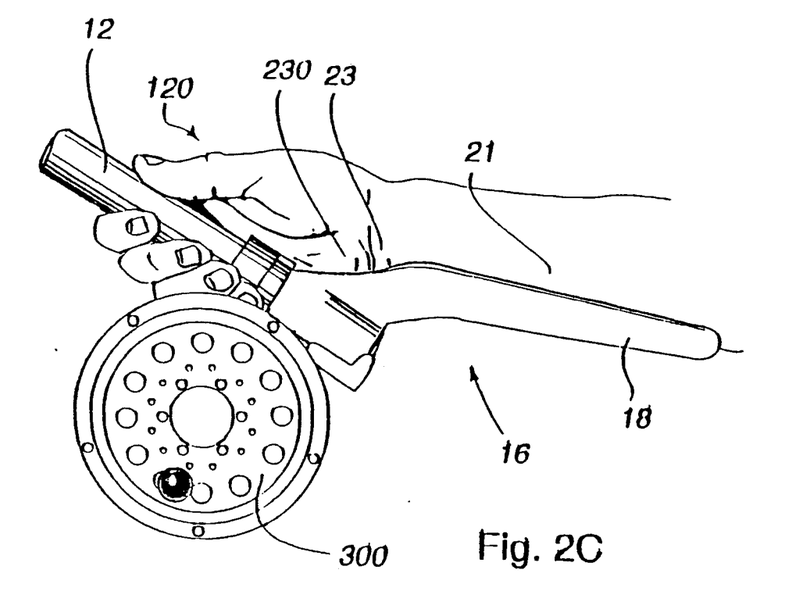
FIG. 2C, first embodiment in use with fly reel, side elevation.

That longitudinal removal of the extension will not occur until wanted is ensured by, referring to FIG. 2, screw indicated generally as 29 inserted through hole 34 in extension coupling 16 and into hole 36 in end of handle 12, and therethrough into threaded hole 38 likewise in end of handle 12. It will be appreciated that this conventional means of securing pressure to prevent longitudinal slippage of extension 16 relative to handle 12 could be replaced by other effective and well-known fastening systems, without interfering with the described novel interlocking spline system that prevents rotation of extension 16 relative to handle 12.

The ability to rotate extension handle 16 also provides easy adjustment to accommodate left- or right-handed persons. Incremental rotation of extension 16, relative to handle 12, lends versatility to the subject invention.

Figures 3A, 3B:
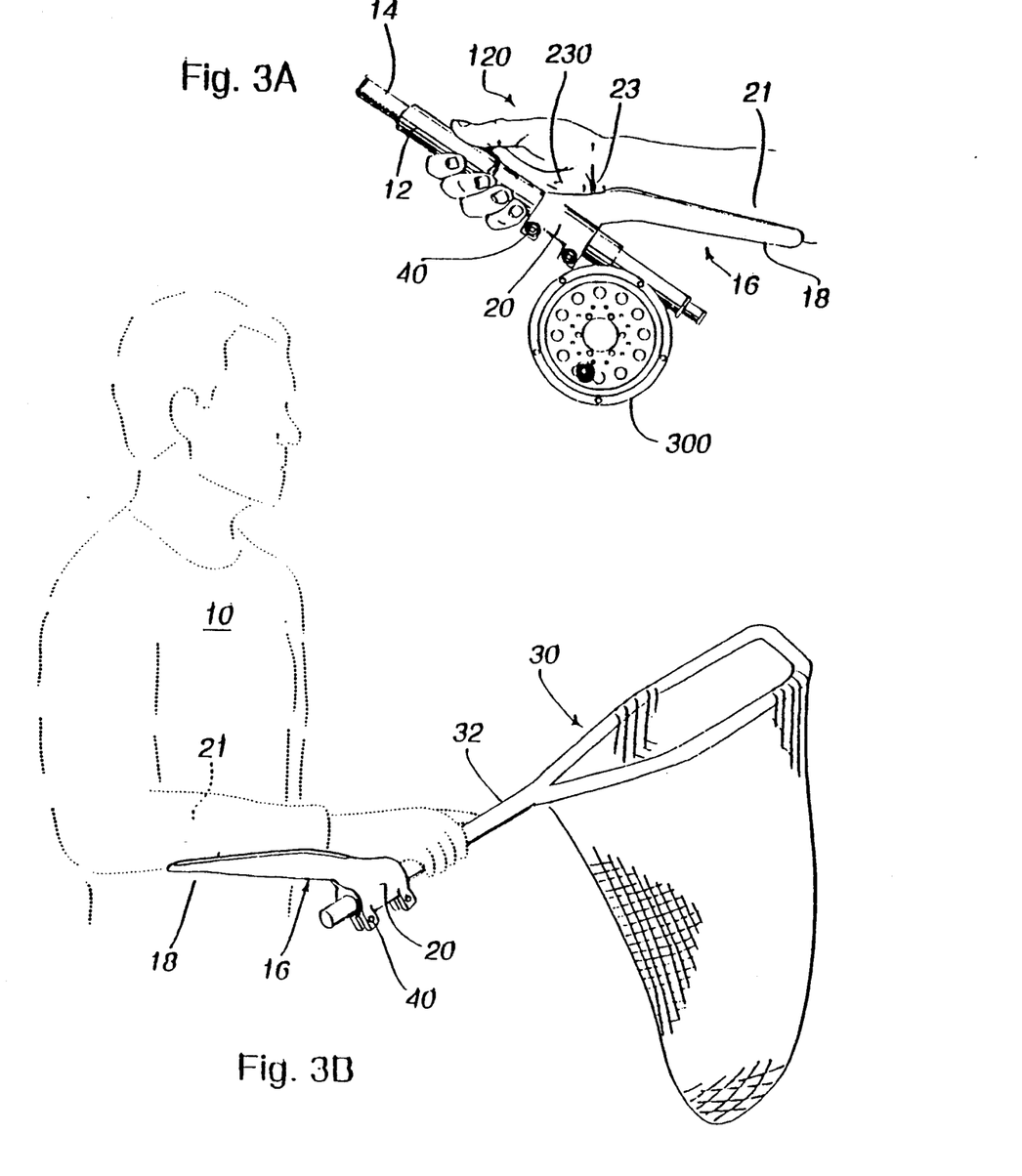
FIG. 3A, second embodiment in use with fly reel, side elevation.
FIG. 3B, second embodiment; net, in use situation; perspective view.
Figures 4, 5, 6:
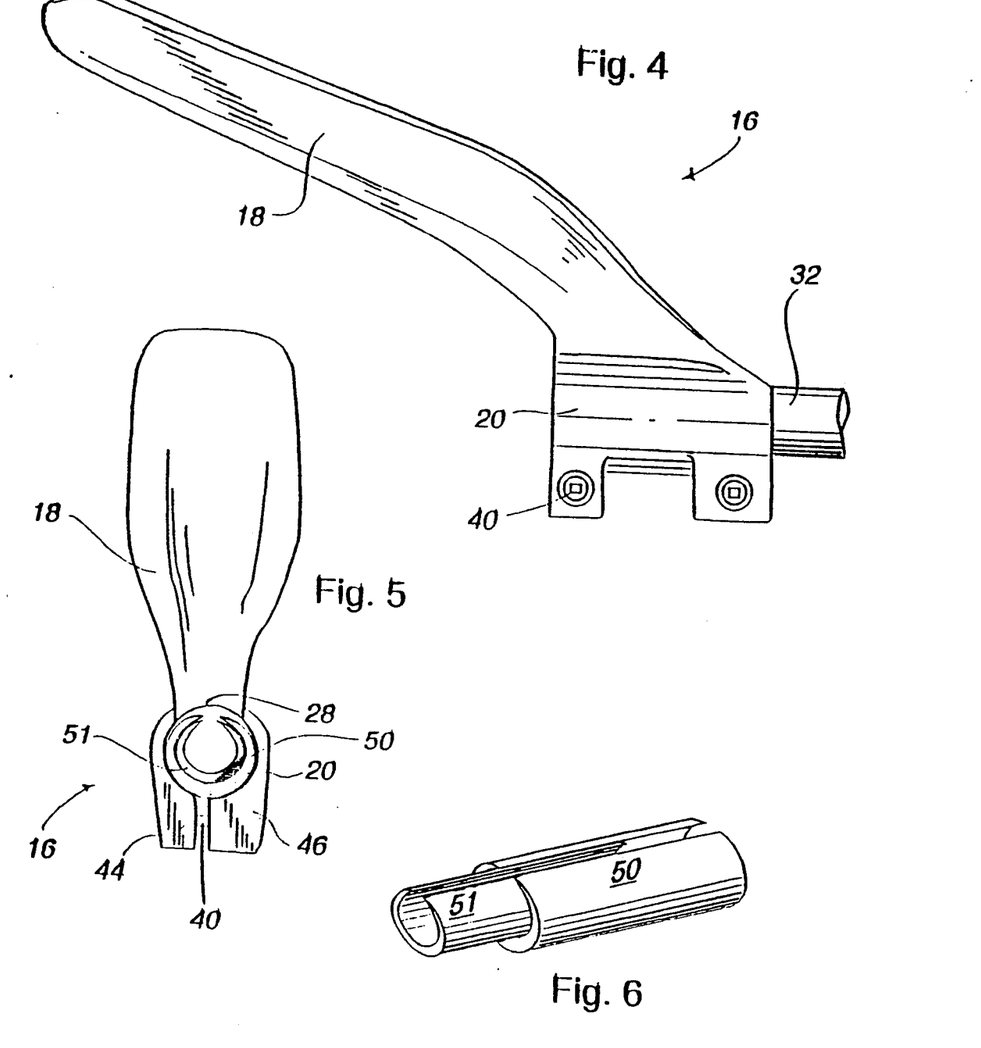
FIG. 4, alternative view of second embodiment; side elevation.
FIG. 5, alternative view of second embodiment; front elevation.
FIG. 6, second embodiment detail from FIG. 5; perspective view.
Figures 7, 8:
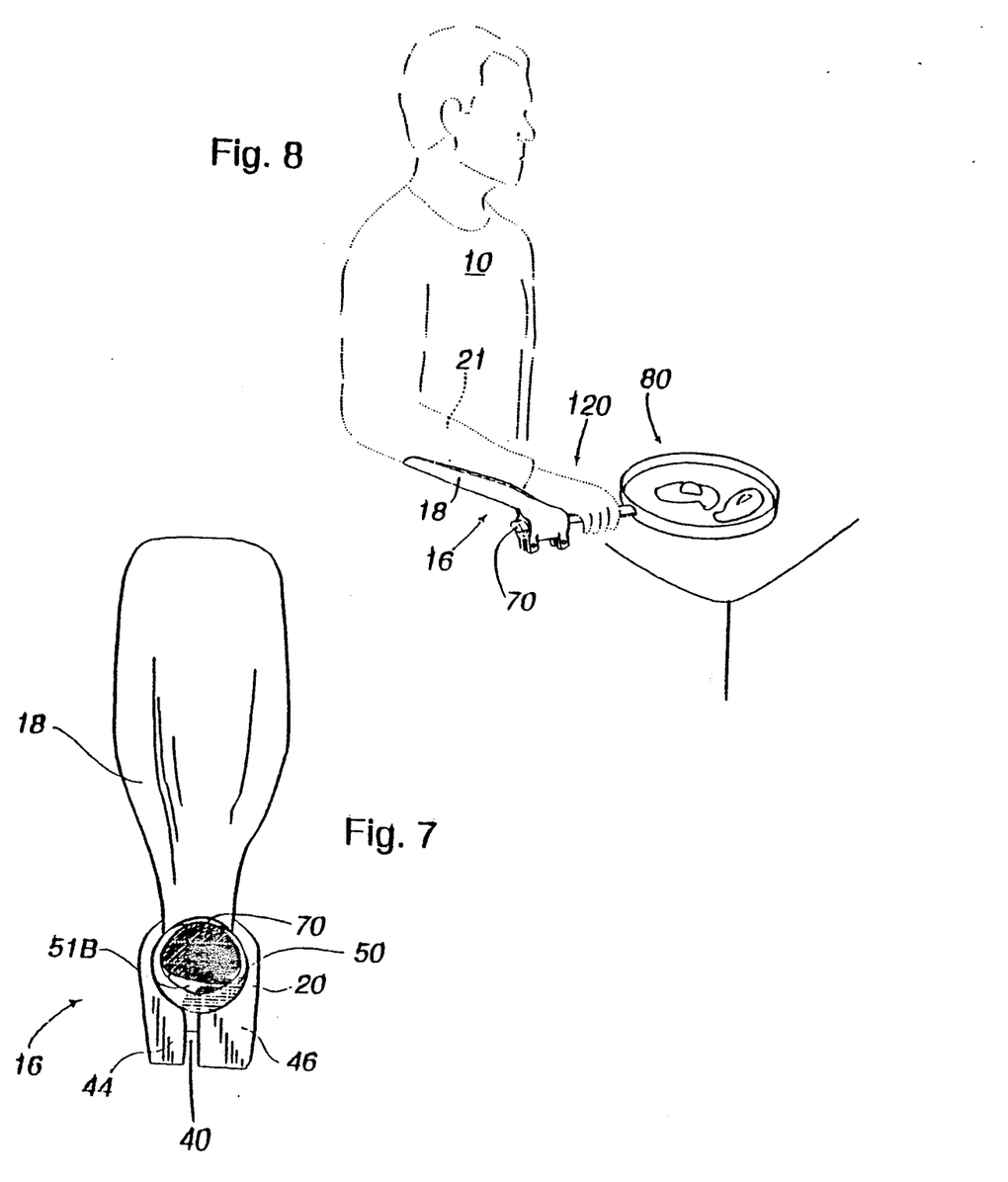
FIG. 7, usage situation of the second embodiment, showing section of frying pan handle; front elevation.
FIG. 8, usage situation of the second embodiment shown in FIG. 7; perspective view.

A second embodiment is illustrated in FIG. 3A, again fly-fishing with fly reel 300 as in FIG. 2C, in which coupling portion 20 of extension 16 has tightenable fasteners (here screws) 40. FIG. 3B shows the same embodiment fastened onto handle 32 of net 30. On FIGS. 4 and 5 it can be easily seen that net handle 32 (shown in FIG. 4) will fit through hole defined by inner cylindrical surface 28 (shown in FIG. 5) in extension coupling 20, and inside sizing bushings 50 and 51 which can be placed as needed (more or less than these two bushings 50 and 51 shown could be used). FIG. 6 shows the fit of the bushings 50 and 51 in a perspective view outside coupling 20. Thereafter screws 40, threaded into holes (not shown) in arm 44 of coupling 20, as seen on FIG. 5, will be tightened to bring opposing arm 44 of coupling 20, as seen on FIG. 5, will be tightened to bring opposing arm 46 of coupling 20 closer, preventing slippage or rotation between extension 16 and net handle 32 (shown on FIG. 4). Such a clamped extension could identically be accomplished on a fishing rod handle 12 such as shown in FIG. 3a, or other handle, and the use of sizing bushings ensures that a wide range of sizes of any one tool or rod can be accommodated; for instance in the example bushings 50 and 51 allow for diameters as wide as 1 and ⅜ inches and as narrow as ⅝ inches. Since the bushing material is flexible and cutable, non-round handles can be snugged at any rotation angle desired by cutting bushing pieces and inserting them, as shown on FIG. 7, which is a cross-section of a frying pan handle 70 held in place by bushing 50 and bushing piece 51B. The frying pan indicated as 80 is shown in usage position in FIG. 8.

Figure 9:
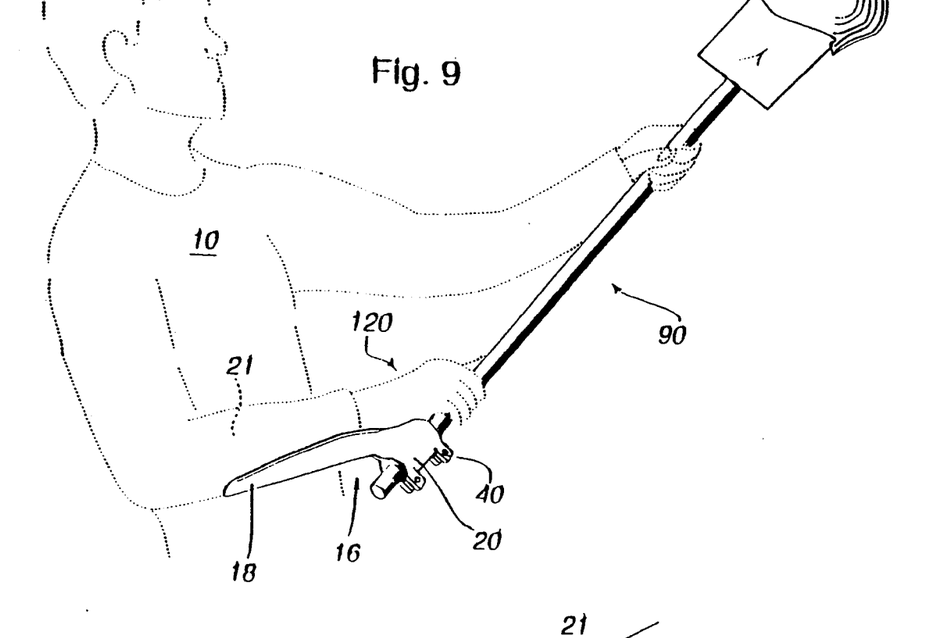
FIG. 9, alternative use of the second embodiment; perspective view.
Figure 9B:
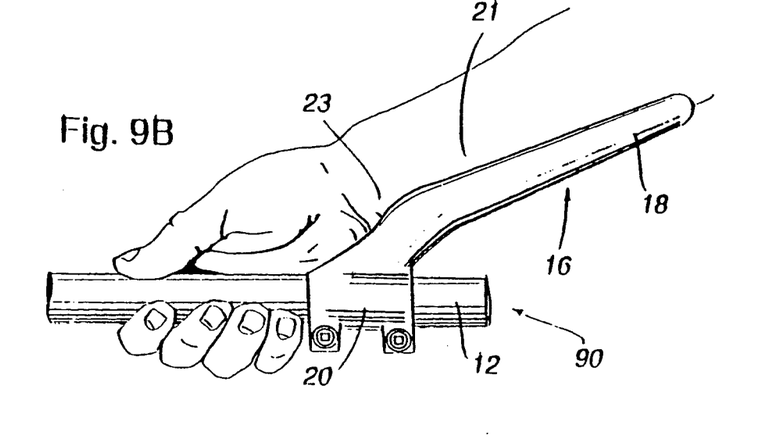
FIG. 9B, detail of FIG. 9; side elevation.
Figures 10, 10B:
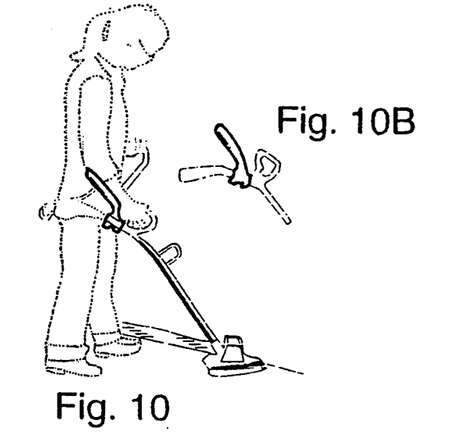
FIGS. 10, 10B, 11, 12, 12B, 13, 13B, 14, 14B, 15, 16, 16B, 17, 17B, 18 and 19, alternative uses of the second embodiment.
Figure 11:
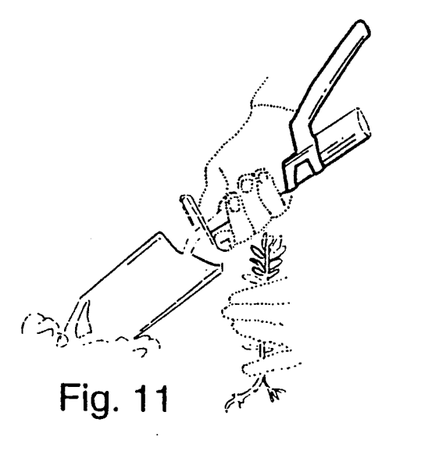
Figure 12:
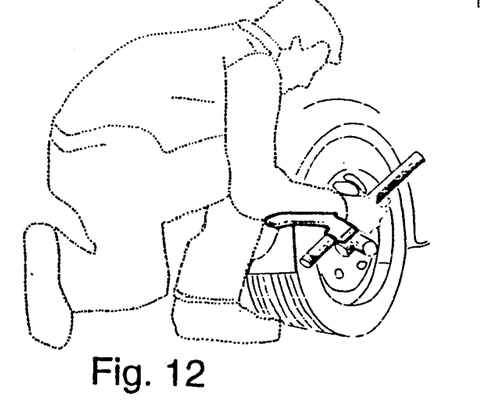
Figure 12B:
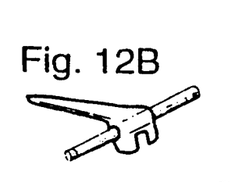
Figures 13, 13B:
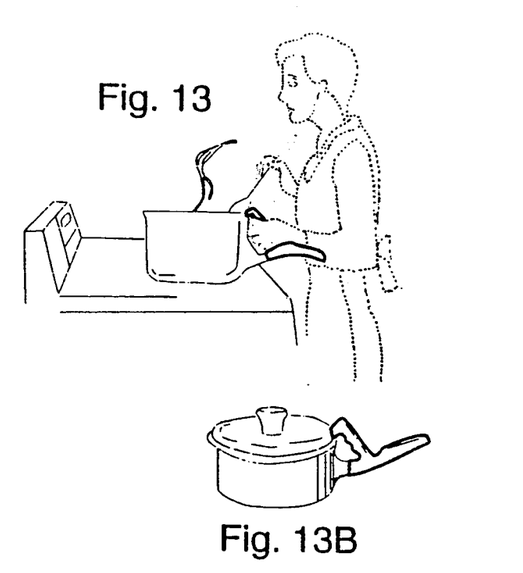
Figures 14, 14B, 15:
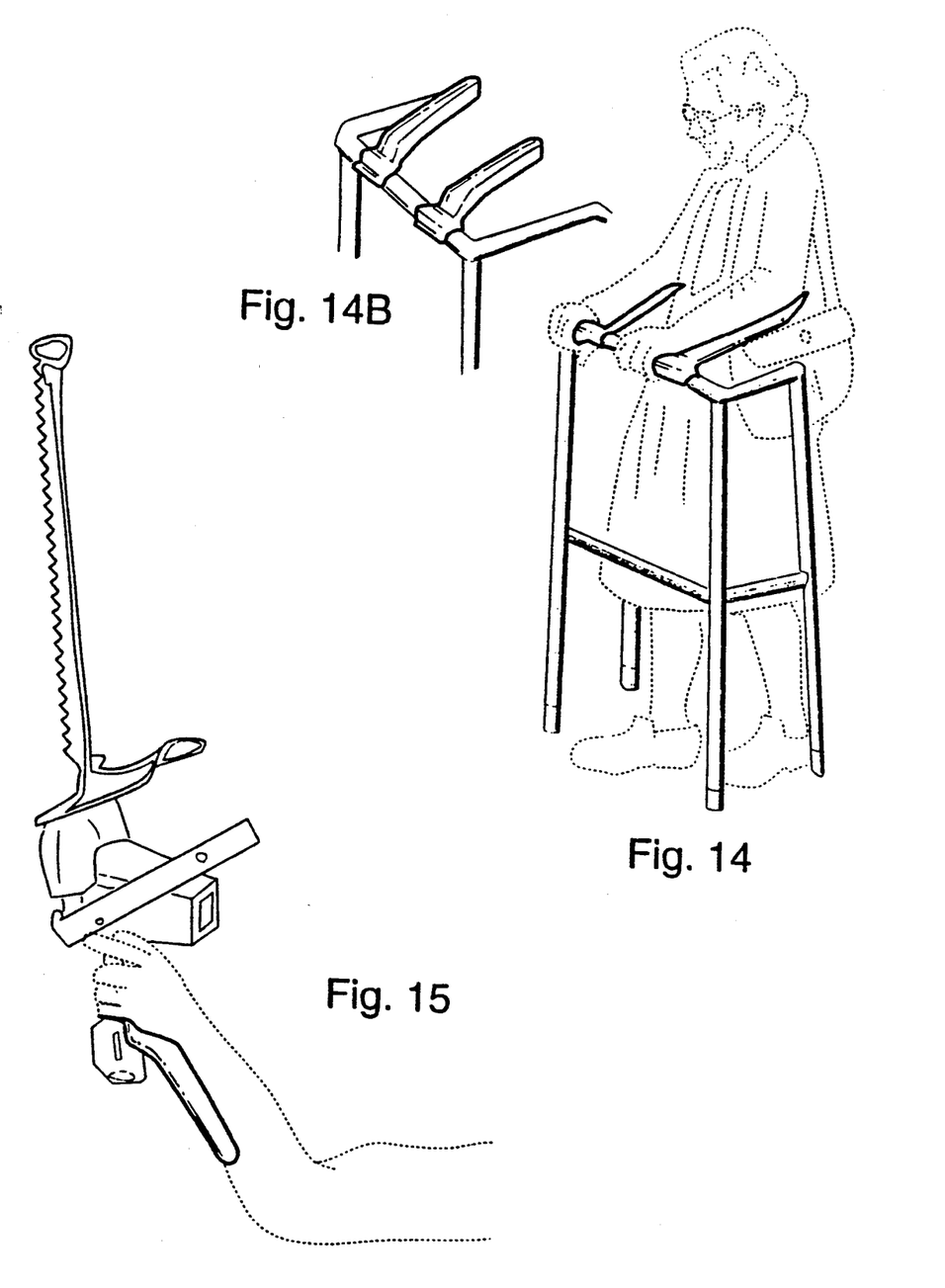
Figures 16, 16B, 17, 17B, 18, 19:
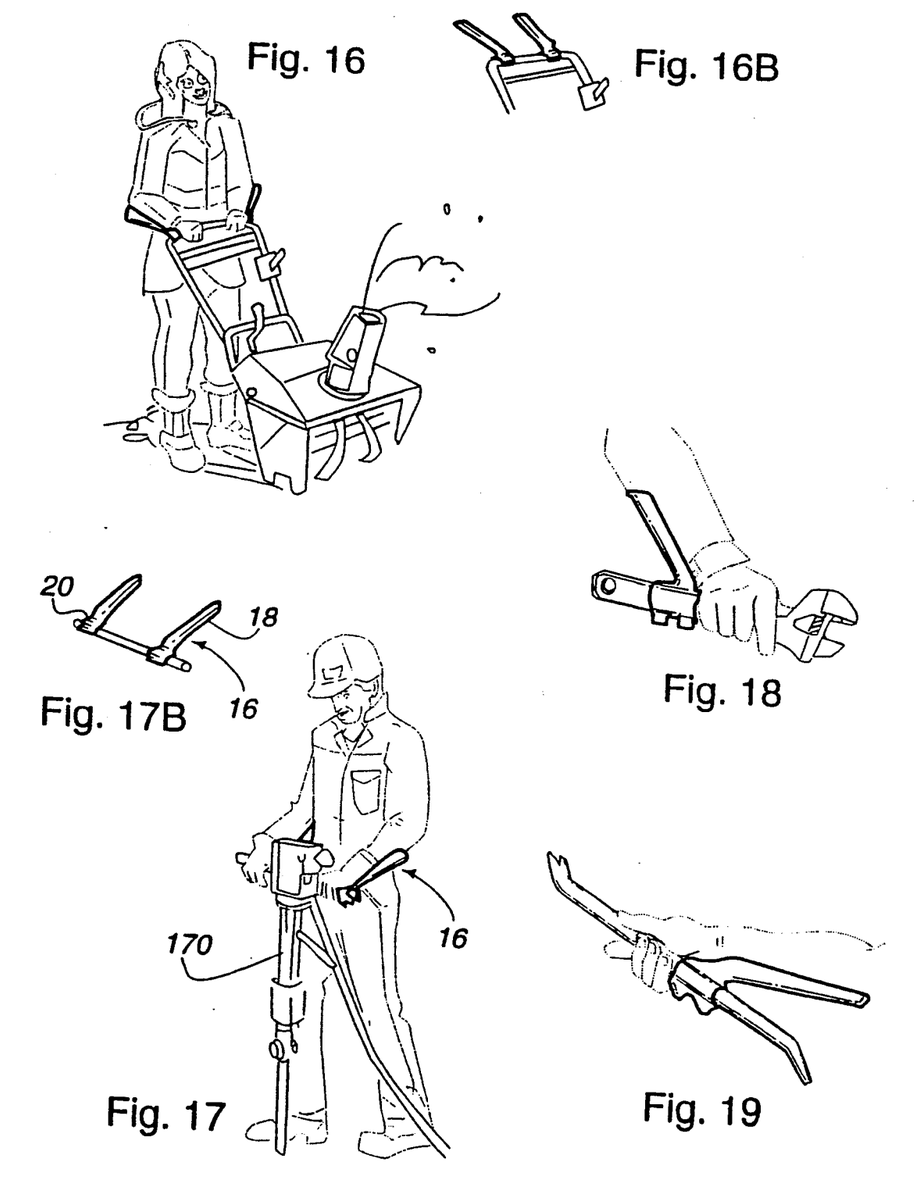

Of course, shovels or the like, for example the shovel 90 shown in FIG. 9, can benefit particularly from this invention's ergonomic design, which causes energy to flow from the arm to the hand, giving additional comfort to the user of this and other strength-needing tools. This is seen most clearly in FIG. 9B, showing handle 12 of a tool such as shovel 90, where, as in FIGS. 2C and 3A, the shape of flange 18 is shown to cup and hold forearm 21; and the natural angle of wrist 23 is comfortably matched by the angle of flange 18 relative to coupling portion 20 of extension 16. FIGS. 10 through 19, in which extension 16 is shown blacked-in in schematic form, illustrate just a few of the many usage situations this invention can be put to: FIGS. 10 and 10B show a floor-polisher; FIG. 11 a garden trowel; FIGS. 12 and 12B a tire iron; FIGS. 13 and 13B a large and mid-sized cooking pot, respectively; FIGS. 14 and 14B a walker; FIG. 15 a motorized hedge-trimmer; FIGS. 16 and 16B a snow-blower; FIGS. 17 and 17B a jack-hammer; FIG. 18 a wrench; and FIG. 19 a crow-bar. Notice that several of the Figures, for instance the jack-hammer 170 in FIG. 17, show that the invented extension 16 may be designed with its flange 18, as shown best in FIG. 17B, at a right angle to the axis of the coupling 20; or in fact at any desired angle that supports the natural angle of a wrist and forearm of a user while they employ a tool.

It should be especially noted due to the wide range of applications of this invention, that the foregoing is by way of example only, and the scope of the invention should be limited only by the appended claims.

The embodiments of the invention in which an exclusive property or privilege is claimed are defined as follows:

1. A system for fixing and reversibly adjusting relative rotation between two coaxial tubular members, comprising:

a shaft fashioned to fit closely overtop of an inner tubular member, the shaft being solidly affixed to said member;

a plurality of generally identical equally-spaced longitudinal splines extending radially outwards from the shaft;

an outer tube formed to closely receive and closely fit overtop the inner tubular member;

a plurality of generally identical longitudinal splines along the inside surface of the outer tube; said splines on the outer member being fashioned to co-operate with the splines extending radially outwards from the shaft; and reversible means of preventing longitudinal separation between the inner and outer tubular members;

whereby the outer tube can be placed coaxial with, and at a desired angle of rotation relative to, the inner tubular member, and overtop the inner member, and fixed both rotationally and longitudinally relative to the inner member by said means of preventing longitudinal separation;

and whereby the outer tube can be moved to a new angle of rotation relative to the inner tubular member by disengaging the means of preventing longitudinal separation; separating the inner and outer tubes longitudinally; rotating the outer relative to the inner tubular member to a new angle of rotation; placing the outer tube overtop and coaxial with the inner member; and re-engaging the means of preventing longitudinal separation.

2. A system as in claim 1, where the inner tubular member is a handle.

3. A system as in claim 2, where the outer tube comprises also a weight-bearing extension formed to fit a user's forearm.

4. A system as in claim 1, where the inner tubular member is a fishing-rod handle.

5. A system as in claim 4, where the outer tube comprises also a weight-bearing extension formed to fit a fishing-person's arm from the heel of the hand along the wrist and forearm.

6. A system as in claim 1, where longitudinal separation between the inner and outer tubular members is prevented by a screw inserted longitudinally through the outer tube and threaded into a hole inside and coaxial with the inner tubular member.

7. A weight-bearing system for a fishing rod handle or net handle providing user-choosable incrementally rotatable support positions, comprising:

(a) a shaft securely affixed overtop of the end of the handle;

(b) a plurality of generally identical equally-spaced longitudinal splines extending radially outwards from the shaft;

(c) an extension formed to fit a user's arm from the heel of the hand along the wrist and forearm;

(d) a hole in the extension fashioned to closely receive and closely fit the shaft;

(e) a plurality of generally identical longitudinal splines along the inside surface of the hole; said splines being fashioned to co-operate with the splines extending radially outwards from the shaft, this co-operation having as it primary function the prevention of rotation of the shaft relative to the extension;

(f) a means of attaching the extension to the handle or to the shaft to prevent longitudinal separation between the extension and shaft; this means being removable to permit such separation when desired.

8. A system as in claim 7, in which the means of attaching is a screw inserted in a hole in the extension and threaded into a hole in the handle end, such that threading the screw inside the handle pulls the head of the screw against the extension, thereby pulling the extension and handle together longitudinally.

* * * * *